United States Patent
Roth et al.

(10) Patent No.: US 9,847,983 B1
(45) Date of Patent: Dec. 19, 2017

(54) EPOCH-BASED MANAGEMENT OF SECURITY CREDENTIALS

(71) Applicant: Amazon Technologies, Inc., Reno, NV (US)

(72) Inventors: Gregory Branchek Roth, Seattle, WA (US); Benjamin Tillman Farley, Seattle, WA (US); Graeme David Baer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 700 days.

(21) Appl. No.: 14/264,897

(22) Filed: Apr. 29, 2014

(51) Int. Cl.
*H04L 29/06* (2006.01)
(52) U.S. Cl.
CPC ..................... *H04L 63/08* (2013.01)
(58) Field of Classification Search
CPC ........................................................ H04L 63/08
USPC .............................................................. 726/6
See application file for complete search history.

(56) References Cited

U.S. PATENT DOCUMENTS

| | | | |
|---|---|---|---|
| 9,077,703 B1 * | 7/2015 | Goshen | H04L 63/08 |
| 2006/0230265 A1 * | 10/2006 | Krishna | H04L 63/08 713/158 |
| 2007/0136795 A1 * | 6/2007 | Youn | H04L 63/0846 726/5 |
| 2010/0024014 A1 * | 1/2010 | Kailash | H04L 9/3213 726/6 |
| 2010/0125903 A1 * | 5/2010 | Devarajan et al. | 726/15 |
| 2012/0240183 A1 * | 9/2012 | Sinha | 726/1 |
| 2013/0061300 A1 * | 3/2013 | Novak et al. | 726/6 |
| 2013/0061301 A1 * | 3/2013 | Novak | H04L 63/0846 726/6 |

OTHER PUBLICATIONS

Web article: "IAM Rules for Amazon EC2" published by Amazon [online][retrieved on Mar. 12, 2014] retrieved from: http://docs.aws.amazon.com/AWSEC2/latest/UserGuide/iam-roles-for-amazon-ec2.html, 4 pps.

* cited by examiner

*Primary Examiner* — Anthony Brown
*Assistant Examiner* — William Corum, Jr.
(74) *Attorney, Agent, or Firm* — Lee & Hayes, PLLC

(57) ABSTRACT

Technologies are disclosed herein for epoch-based expiration of temporary security credentials. A temporary security credential is issued that identifies one or more epochs and that specifies one or more versions of the identified epochs during which the temporary security credential is valid. The temporary security credential may then be utilized to request access to another system, service or component. In order to determine whether such a request may be granted, current epoch versions for the epochs identified in the temporary security credential are obtained. The current epoch versions for the identified epochs are then compared to epoch versions specified in the temporary security credential to determine if the request can be granted. The current epoch versions may be periodically modified in order to expire previously issued temporary security credentials. A temporary security credential might also specify an expiration time after which the temporary security credential is no longer valid.

20 Claims, 9 Drawing Sheets

EPOCH-BASED MANAGEMENT OF SECURITY CREDENTIALS

BACKGROUND

It is desirable in some distributed computing environments to provide security credentials that are valid only for a temporary period of time to various systems and/or services operating therein. The temporary security credentials might be utilized by these systems and/or services to access other systems and/or services on a temporary basis. For example, the temporary security credentials might specify an encryption key and/or other types of data that might be utilized to cryptographically sign requests to other systems and/or services during a limited window of time.

In order to provide the functionality described above, temporary security credentials may be provided that expressly specify a fixed expiration time. For example, temporary security credentials might be provided to a service for use in making service calls that expire after six hours has elapsed, or another specified time period. New temporary security credentials having a fixed expiration at a later time might also be provided to the service prior to the expiration of the previously provided temporary security credentials. For example, new temporary credentials that also expire after six hours has elapsed might be provided to the service every hour, or some other time period that is less than six hours.

While the mechanism described above for distribution of temporary security credentials works well under normal operating conditions, there are times when such a system might cause the proper execution of dependent systems or components in the distributed computing environment to fail. For example, the system providing the temporary security credentials may become inoperable or inaccessible for some reason. In this scenario, it is possible for the temporary security credentials provided to a system or service to expire before new temporary security credentials have been received. If this occurs, the system or service may be unable to access other systems as designed and, therefore, unable to perform its intended functionality.

In order to account for the possibility that temporary security credentials with a fixed expiration time might not be provided according to schedule due to an operational difficulty, the expiration time set forth in the temporary security credentials is typically set much further in the future than actually needed in order to complete refreshing of the credentials. For instance, in the example described above, temporary security credentials might be provided that specify an expiration time six hours in the future even when it is typically possible to refresh the temporary security credentials every hour under normal operating conditions. In this way, dependent services can continue operating for approximately five hours even in the event of a failure of the service that provides the temporary security credentials. This also means, however, that the temporary security credentials are valid, in this example, for approximately five hours longer than they actually need to be.

It is with respect to these and other considerations that the disclosure made herein is presented.

DETAILED DESCRIPTION

Figure 1:
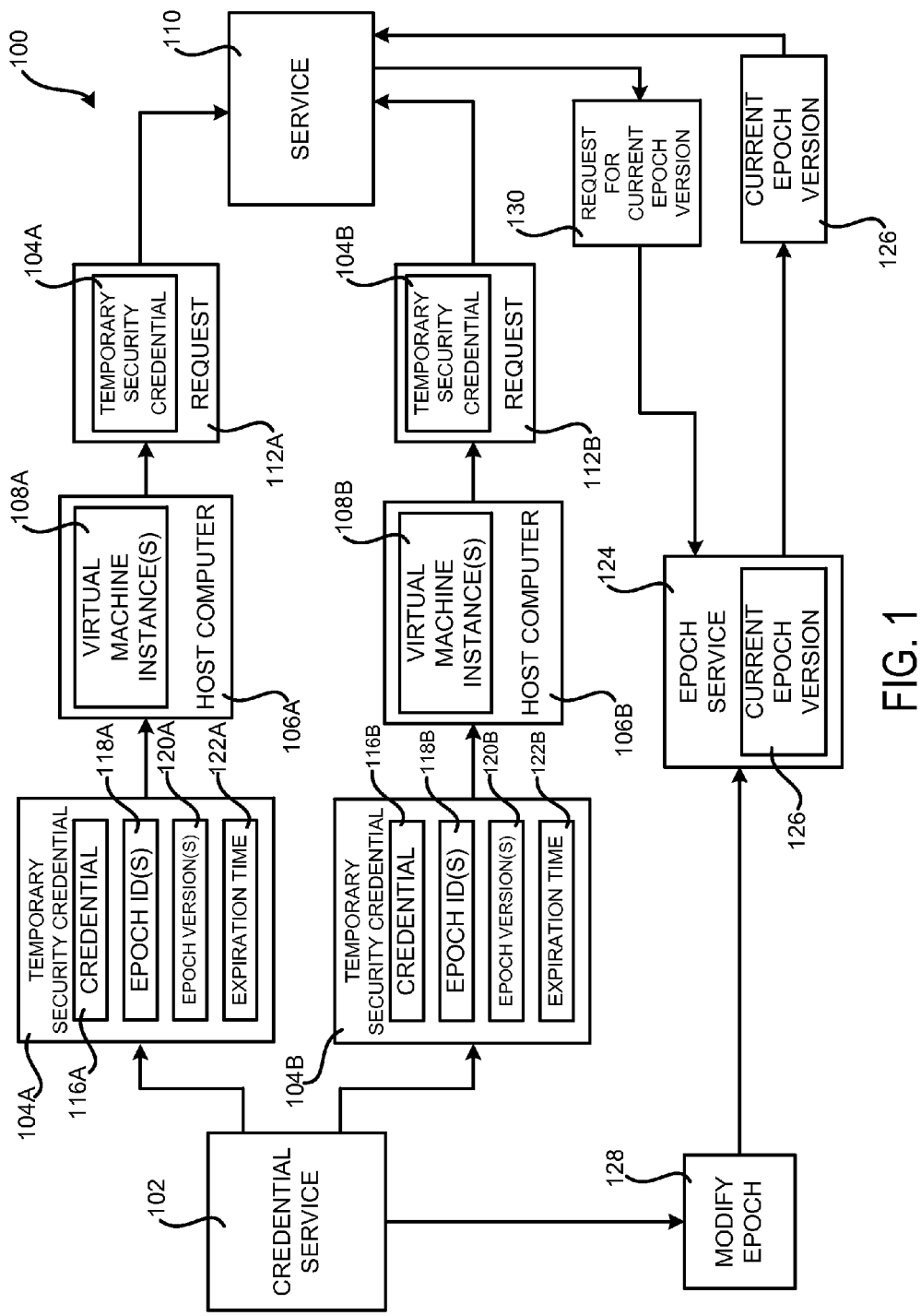
FIG. 1 is a system diagram showing aspects of the configuration and operation of one system disclosed herein for epoch-based expiration of temporary security credentials, according to one illustrative embodiment.

The following detailed description is directed to technologies for epoch-based management of the lifetime of temporary security credentials. Through the use of an implementation of the technologies disclosed herein, the amount of time that temporary security credentials are valid for may be minimized while the system that provides the temporary security credentials is operating normally. If an operational issue impacts the system that provides the temporary security credentials, the amount of time that the temporary security credentials are valid for may be extended without issuing new security credentials. In this way, an operational issue affecting a system, service or component that issues temporary security credentials may be isolated and prevented from impacting the operation of dependent systems or services that utilize the temporary security credentials to access other systems and/or services.

According to one embodiment disclosed herein, a credential service is provided that generates and distributes temporary security credentials. The temporary security credentials include a credential that may be used by other components, systems, or services when submitting requests to access functionality provided by other components, systems or services. The temporary security credentials generated by the credential service might also include one or more epoch identifiers that identify epochs that are to be consulted to determine whether the temporary service credentials are valid. Each epoch identifier might be a unique alphanumeric identifier, for example. The epoch identifiers might also be associated with a geographic region, an availability zone, a role, an identity corresponding to the temporary security credential, the credential service or another service for generating the temporary security credentials, a host computer or other type of system that receives and utilizes a temporary security credential, a customer account, or another entity.

The temporary security credentials also define one or more epoch versions for each specified epoch identifier. The epoch versions define a version, or versions, for an epoch during which the temporary security credentials are valid. For example, a temporary security credential might specify epoch $\alpha=1$, where $\alpha$ is the epoch identifier and 1 is the epoch version. In this example, the temporary security credential is valid only while the current version of epoch $\alpha=1$.

As mentioned above, the credential service might distribute temporary security credentials to other systems, services, and/or components. For example, the credential service might distribute a temporary security credential to a host computer executing an application, or applications, in one or more virtual machine instances. An application executing on the host computer may utilize the temporary security credential to access other network-based services, systems, or components. For example, a service request might be generated and transmitted to a computer system to utilize a network service provided by that system.

In response to receiving a service request that includes a temporary security credential, a called service might determine whether to grant the request based, at least in part, on a version of the epoch identified in the temporary security credential and a current epoch version for the epoch identified in the temporary security credential. In order to obtain the current epoch version for the epoch identified in the temporary security credential, the called service might obtain the current epoch version from an epoch service that exposes current epoch versions to interested parties. Other mechanisms might also be utilized to obtain current epoch versions including, but not limited to, obtaining them from a database or other network location, obtaining a broadcast message that includes current epoch versions, or in other ways.

If the current epoch version matches the epoch version, or versions, specified in the temporary security credential, then the called service may grant the request. The called service may deny the request if the current epoch version does not match the epoch version, or versions, specified in the temporary security credential. Additionally, in some embodiments, a temporary security credential might also specify an expiration time after which the temporary security credential is invalid. In this embodiment, a called service might also deny a request if the expiration time identified in a supplied temporary security credential has passed. Other mechanisms might also be utilized to expire temporary security credentials in conjunction with the mechanisms disclosed herein for epoch-based expiration.

In order to expire temporary security credentials, the current epoch version for the referenced epochs may be modified by the credential service or another entity. For example, in one embodiment, the credential service may instruct the epoch service to modify the current epoch version for one or more epochs. For instance, in the example given above, the credential service might instruct the epoch service to change the current epoch version for epoch $\alpha$ to 2. In this way, any temporary security credential specifying epoch $\alpha=1$ will be rendered invalid. The current epoch version would typically only be modified in this fashion once new temporary security credentials with epoch $\alpha=2$ have been generated and issued to dependent components. In some embodiments, the epoch service may be configured to permit modification of a current epoch version only after some predetermined period has elapsed since the previous modification of the current epoch version. This may prevent inadvertent or premature modification of a current epoch version.

As mentioned above, the timing of the modification of current epoch versions may be based, at least in part, upon the status of the service responsible for issuing the temporary security credentials. For example, if the credential service is operating normally and is timely issuing temporary security credentials, then the current epoch versions may be modified more quickly (e.g. as soon as all of the temporary security credentials have been issued that reflect a modified epoch version). If, however, there is an operational issue with the credential service that prevents it from generating and issuing temporary security credentials in a timely manner, then the current epoch versions might not be modified, or might be modified more slowly. In this way, the lifespan of the temporary security credentials can be modified post-issuance based upon the health of the credential service or other service tasked with generating and issuing the temporary security credentials. Additional details regarding the implementation and operation of the mechanisms disclosed herein for epoch-based expiration of security credentials are provided below with regard to FIGS. 1-7.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing aspects of the configuration and operation of a distributed computing environment 100 that may be utilized to implement the technologies disclosed herein for epoch-based expiration of temporary security credentials. The illustrative distributed computing environment 100 shown in FIG. 1 includes a credential service 102, one or more host computers 108, one or more services 110, and an epoch service 124. In this regard, it should be appreciated that the distributed computing environment 100 shown in FIG. 1 has been simplified for discussion purposes, and that the distributed computing environment 100 may include many more components, systems, services, computing devices, networks, networking devices, software components, and other items than shown in FIG. 1. Additionally, the various components shown in FIG. 1 might be configured differently than shown in FIG. 1, and some or all of the described functionality might be performed by different components and/or combinations of components. In this regard it should also be appreciated that the distributed computing environment 100 shown in FIG. 1 is merely illustrative and should not be construed as being limiting in any way.

As shown in FIG. 1 and mention briefly above, the distributed computing environment 100 includes a credential service 102 in one implementation. The credential service 102 is a network service that is configured to generate and distribute temporary security credentials 104. The temporary security credentials 104 might be distributed using various "push", "pull", or other types of distribution mechanisms in various embodiments.

The temporary security credentials 104 include a credential 116 that may be used by other components, systems, and/or services when submitting requests to access functionality provided by other components, systems and/or services. For example, the credential 116 might include a cryptographic key for use in signing requests to access functionality provided by other systems and/or services. Other types of credentials 116 might also be provided. For example, and without limitation, the credentials 116 might include X509 certificates, Kerberos tickets, Web site cookies, or data identifying a session.

It should also be appreciated that the credentials 116 may be stateless and, therefore, may be verifiable by themselves. As a result, revocation and rotation of the credentials 116 may pose unique technical challenges as compared to systems wherein credentials are stored in a database or another type of system in which a credential may be easily deleted once the credential has been revoked. The embodiments disclosed herein attempt to address these and other considerations.

In the example shown in FIG. 1 the credential service 102 has generated a temporary security credential 104A and issued the temporary security credential 104A to a software component executing on the host computer 106A. In turn, the software component executing on the host computer 106A has utilized the temporary security credential 104A and the credential 116A contained therein in conjunction with a request 112A to access functionality provided by the service 110 (which might be referred to herein as a "called service").

Similarly, the credential service 102 has also generated a temporary security credential 104B and issued the temporary security credential 104B to a software component executing on the host computer 106B. In turn, the software component executing on the host computer 106B has also utilized the temporary security credential 104B and the credential 116B contained therein in conjunction with a request 112B to access functionality provided by the service 110. Although the example shown in FIG. 1 illustrates the temporary security credentials 104A and 104B being utilized to access the same service 110, it should be appreciated that the temporary security credentials 104 might be utilized to access other systems, services and/or components in the distributed computing environment 100. It should also be appreciated that the temporary security credentials 104 and the information contained therein might be cryptographically signed and/or encrypted in various embodiments.

The temporary security credentials 104 generated by the credential service 102 include one or more epoch identifiers 118 that identify epochs that are to be consulted to determine whether the temporary service credentials 104 are valid. For instance, and without limitation, in the example shown in FIG. 1, the temporary security credential 104A specifies one or more epoch identifiers 118A that are to be consulted in order to determine whether the temporary security credential 104A is valid. Similarly, the temporary security credential 104B specifies one or more epoch identifiers 118B that are to be consulted in order to determine whether the temporary security credential 104B is valid. Additional details regarding various mechanisms for determining whether a temporary security credential 104 is valid based upon the specified epochs are provided below.

Each epoch identifier 118 might be a unique alphanumeric identifier or may comprise other types of data that uniquely identifies one or more epochs. The epoch identifiers might also be associated with a geographic region, an availability zone, a role, the credential service 102 or another service for generating the temporary security credentials 104, a host computer 108 or other type of system that receives and utilizes a temporary security credential 104, a customer account, or another entity. A single epoch identifier 118 (i.e. a "global" epoch identifier 118) might also be utilized throughout the distributed computing environment 100.

The temporary security credentials 104 issued by the credential service 102 also specify one or more epoch versions 120 for each specified epoch identifier 118. For instance, and without limitation, in the example shown in FIG. 1, the temporary security credential 104A includes epoch versions 120A corresponding to the epoch identifiers 118A. Similarly, the temporary security credential 104B includes epoch versions 120B corresponding to the epoch identifiers 118B.

The epoch versions 120 define a version, or versions, for a corresponding epoch identifier 118 during which a temporary security credential 104 is valid. For example, a temporary security credential 104 might specify epoch $\alpha=1$, where $\alpha$ is the epoch identifier 118 and 1 is the epoch version 120. In this example, the temporary security credential 140 is valid only while the current version of epoch $\alpha=1$. In this regard, it should be appreciated that a temporary security credential 104 might specify multiple epoch identifiers 118 and multiple epoch versions 120, or ranges of versions, for each of the specified epoch identifiers 118. The temporary security credential 104 might be considered valid if all, or some specified portion, of the epoch versions 120 are consistent with current epoch versions for the specified epoch identifiers 118.

It should also be appreciated that, in some embodiments, a temporary security credential may be received and utilized to compute an authentication claim, such as a signature, that is different from the received credential itself. The computed authentication claim, which is based on the received temporary security credential, may then be utilized to access a called service, for example. In this way, the called service may be able to determine whether the credential was valid without necessarily having received the actual temporary security credential. In this regard, it should be appreciated that the term temporary security credential as utilized herein encompasses all or a portion of a security credential that is utilized to access a called system or service.

It should also be appreciated that the temporary security credentials 104 might not explicitly specify the epoch identifiers 118 and/or epoch versions 120 in some embodiments. In these embodiments, the temporary security credentials 104 might rather specify data through which the epoch identifiers 118 and/or epoch versions 120 for the temporary security credentials 104 may be obtained.

As mentioned above, the credential service 102 might distribute temporary security credentials 104 to other systems, services, and/or components. For example, the credential service 102 might distribute a temporary security credential 104 to host computers 106 in the distributed computing environment 100, which may be executing an application, or applications, in one or more virtual machine instances 108. An application executing directly on a host computer 106, or within a virtual machine instance 108, may utilize a temporary security credential 104 to access other network-based services, systems, or components.

In the example shown in FIG. 1, for instance, an application executing in the virtual machine instance 108A on the host computer 106A has generated a service request 112A to the service 110 utilizing the temporary security credential 104A. Similarly, an application executing in the virtual machine instance 108B on the host computer 106B has generated a service request 112B to the service 110 utilizing the temporary security credential 104B. As will be described in greater detail below, the service 110 is configured to determine whether to grant the requests 112A and 112B based upon the epoch identifiers 118 and epoch versions 120 specified in the temporary security credentials 104A and 104B.

In response to receiving a service request 112 that includes a temporary security credential 104, the called service 110 might determine whether to grant the request 104 based, at least in part, on a version 120 of the epoch, or epochs, identified in the temporary security credential 104 and a current epoch version 126 for the epoch identified in the temporary security credential 104. In order to obtain the current epoch version 126 for the epoch identified in a temporary security credential 104, the called service 110 might transmit a request 130 to obtain the current epoch version 126 from an epoch service 124 that exposes current epoch versions 126 to interested parties. Other mechanisms might also be utilized to obtain current epoch versions 126 including, but not limited to, obtaining them from a database or other network location, obtaining a broadcast message that includes current epoch versions 126, or in other ways.

If the current epoch version 126, or versions, matches the epoch version 120, or versions, specified in the temporary security credential 104 for the specified epoch identifier 118, or identifiers 118, then the called service 110 may grant the request 112. The called service 110 may deny a request 112 if the current epoch version 126 for the identified epoch does not match the epoch version 120 specified in the temporary security credential 104.

In some embodiments, a temporary security credential 104 might also specify an expiration time 122 after which the temporary security credential 104 will be considered invalid. In this embodiment, the called service 110 might also deny a request 112 if the expiration time 122 identified in the supplied temporary security credential 104 has passed. In the example shown in FIG. 1, for instance, the service 110 will deny the request 112A if the expiration time 122A in the temporary security credential 104A has passed. Similarly, the service 110 will deny the request 112B if the expiration time 122B in the temporary security credential 104B has passed. In this regard, it should be appreciated that other mechanisms might also be utilized to expire temporary security credentials 104 in conjunction with the mechanisms described above for epoch-based expiration. It should be appreciated that the expiration time 122 might be specified and evaluated using a logical clock such as a Lamport timestamp, elapsed time, clock time, or another type of expression of time.

In order to expire previously issued temporary security credentials 104, the current epoch version 126 for the epochs referenced by previously issued temporary security credentials 104 may be modified. For example, in one embodiment, the credential service 102 may transmit a request 128 to the epoch service 124 to modify the current epoch version 126 for one or more epochs. For instance, in the example given above, the credential service 102 might instruct the epoch service 124 to change the current epoch version for epoch α to 2. In this way, any temporary security credential 104 specifying epoch α=1 will be rendered invalid.

It should be appreciated that the current epoch version 126 would typically only be modified as described above once new temporary security credentials 104 with epoch α=2 have been generated and issued to dependent components (e.g. the host computers 106A and 106B). In some embodiments, the epoch service 124 might be configured to permit modification of a current epoch version 126 only after some predetermined period has elapsed (e.g. one hour) since the previous modification of the current epoch version 126. This functionality may prevent inadvertent or premature modification of a current epoch version 126.

As discussed briefly above, the timing of the modification of current epoch versions 126 may be based, at least in part, upon the status of the service responsible for issuing the temporary security credentials 104 (e.g. the credential service 102). For example, if the credential service 102 is operating normally and is timely issuing temporary security credentials 104, then the current epoch versions 126 may be modified more quickly (e.g. as soon as all of the temporary security credentials 104 have been issued to the appropriate components that reflect a modified epoch version 126). If, however, there is an operational issue with the credential service 102 that prevents it from generating and issuing temporary security credentials 104 in a timely manner, then the current epoch versions 126 might not be modified, or might be modified more slowly. In this way, the valid lifespan of the temporary security credentials 104 can be modified post-issuance based upon the health of the credential service 102 or other service tasked with generating and issuing the temporary security credentials 104. The valid lifespan of the temporary security credentials 104 might also be based on other considerations.

Figure 2:
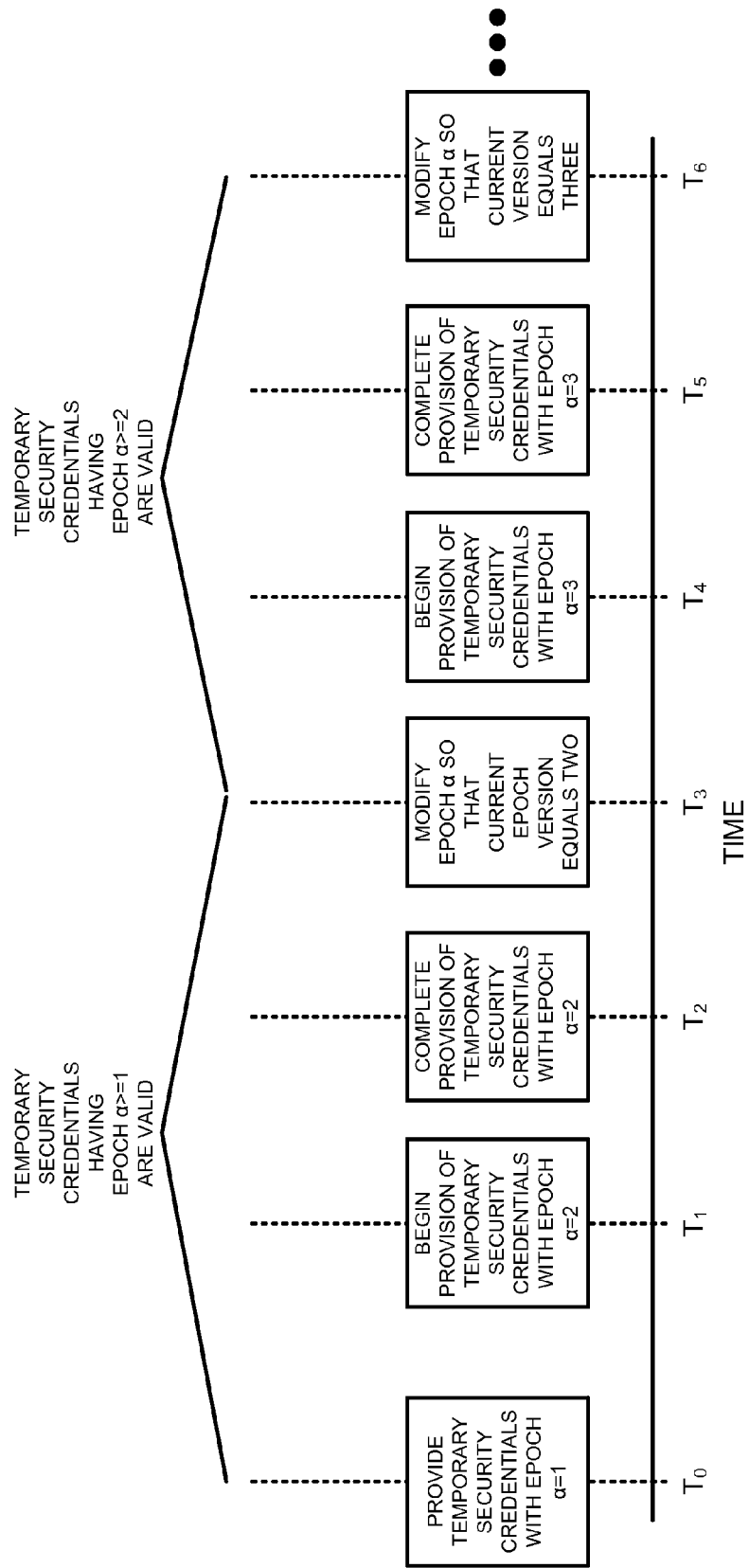
FIG. 2 is a timing diagram showing aspects of the operation of one system disclosed herein for epoch-based expiration of temporary security credentials, according to one illustrative embodiment.

FIG. 2 is a timing diagram illustrating aspects of the operation of the system described above with regard to FIG. 1 for epoch-based expiration of temporary security credentials 104, according to one illustrative embodiment. In particular, FIG. 2 shows an illustrative sequence of operations performed by the credential service 102 over time in order to issue and invalidate temporary security credentials 104. In particular, at time $T_0$ the credential service 102 issues temporary security credentials 104 to the appropriate services or systems (e.g. the host computers 106A and 106B), that include an epoch identifier 118 of α and an epoch version 120 of 1. The services and/or systems that receive temporary security credentials 104 having epoch α=1 can utilize the temporary security credentials 104 while the current epoch version 126 for α is equal to 1. Once the current epoch version 126 for epoch α s no longer equal to one, the temporary security credentials 104 specifying epoch α=1 will no longer be valid. Additional details regarding this process are described below.

At some time after $T_0$, illustrated in FIG. 2. as $T_1$, the credential service 102 may begin issuing temporary security credentials 104 specifying that epoch α=2 (or some other previously unused version). Once the credential service 102 has completed issuing temporary security credentials 104 specifying that epoch α=2 at time $T_2$, the credential service 102 may modify the current epoch version 126 for epoch α to thereby render any previously issued temporary security credentials 104 invalid. For instance, the credential service 102 may transmit a request 128 to the epoch service 124 at time $T_3$ to modify the current epoch version 126 for epoch α to 2.

Figure 3:
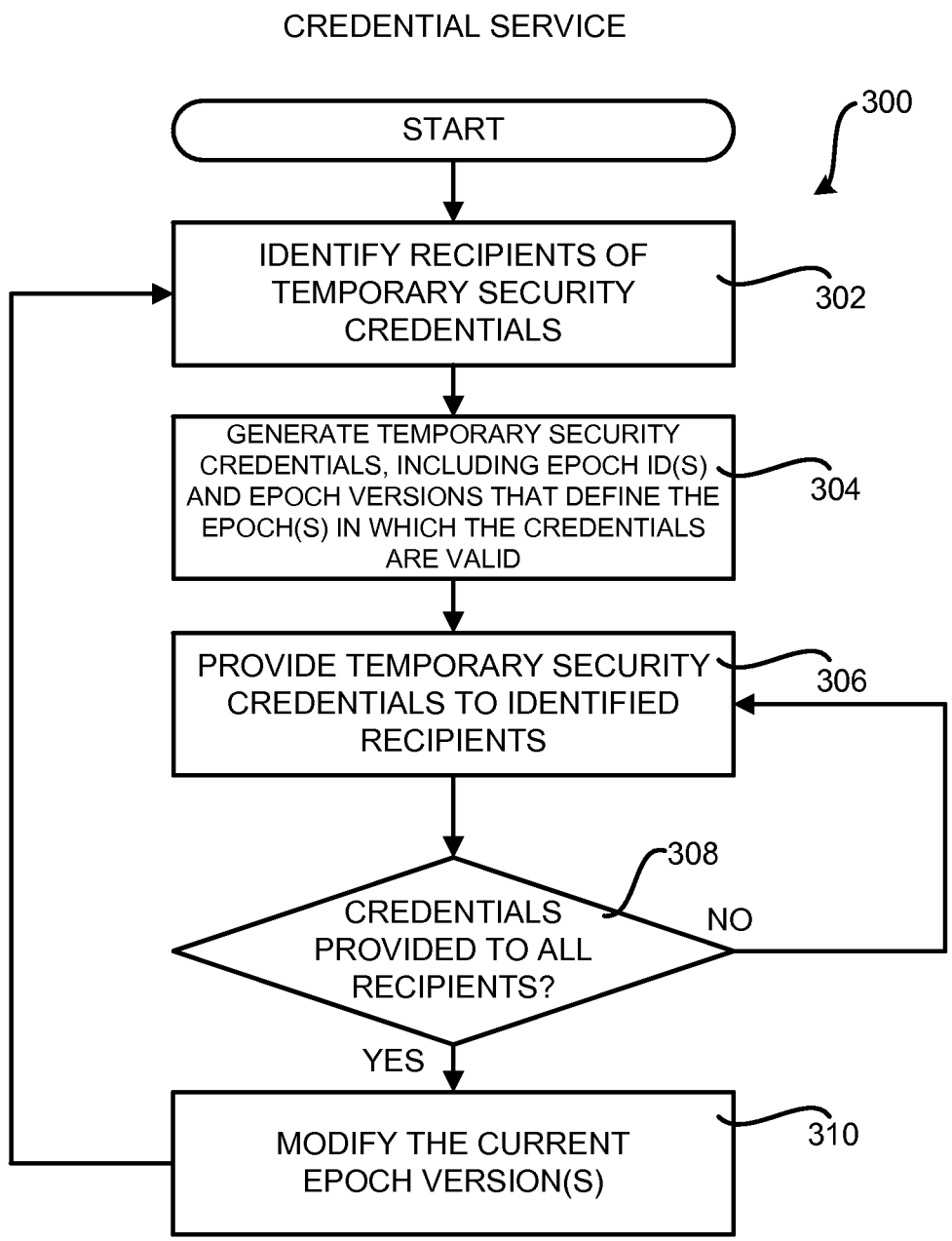
FIG. 3 is a flow diagram showing a routine that illustrates aspects of the operation of a credential service configured to distribute temporary security credentials in one system disclosed herein for epoch-based expiration of temporary security credentials.

At a point in time after $T_3$, illustrated in FIG. 3 as $T_4$, the credential service 102 might begin issuing temporary security credentials 104 that specify epoch α=3 (or some other previously unused version). Once the credential service 102 has completed issuing new temporary security credentials 104 specifying epoch α=3 at time $T_5$, the credential service 102 might provide a request 128 to the epoch service 124 to modify the current epoch version 126 for epoch α to 3 (e.g. at time $T_6$). In this way, any previously issued temporary security credentials 104 that do not specify epoch α=3 may be rendered invalid.

It should be appreciated that, in the example shown in FIG. 2, temporary security credentials specifying epoch α>=1 are valid between $T_0$ and $T_3$. Temporary security credentials specifying epoch α>=2 are valid between $T_3$ and $T_6$. It should also be appreciated that the process shown in FIG. 2 may continue indefinitely to continually provide new temporary security credentials 104 to the various systems, services and/or components in the distributed computing environment 100.

FIG. 3 is a flow diagram showing a routine 300 that illustrates aspects of the operation of the credential service 102 for distributing temporary security credentials 104 in one embodiment disclosed herein. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 300 begins at operation 302, where the credential service 102, or other entity tasked with issuing temporary security credentials 104, may identify the various entities for which temporary service credentials 104 are to be generated and distributed. As mentioned above, epoch identifiers 118 might be associated with a geographic region, an availability zone, a role, the credential service 102 or another service for generating the temporary security credentials 104, a host computer 106 or other type of system that receives and utilizes a temporary security credential 104, a customer account, or another entity. Based upon this association, the credential service 102 might determine that temporary security credentials 104 are to be generated for certain systems in a particular geographic region (e.g. computers in a certain data center), the systems in a particular availability zone, systems that have been assigned a certain role, systems associated with a customer account, or based upon other factors or considerations. Other mechanisms might also be utilized to identify the systems, services, components or other entities for which temporary service credentials 104 are to be generated at a particular point in time.

Once the credential service 102 has identified the systems, services and/or components for which temporary service credentials 104 are to be generated, the routine 300 proceeds to operation 304. At operation 304, the credential service 102 generates the temporary security credentials 104. As discussed above, each temporary security credential 104 specifies one or more epoch identifiers 118 and one or more versions 120 of the specified epoch identifiers 118 during which the temporary security credential 104 is valid. As also mentioned above, a temporary security credential 104 might also specify an expiration time 122 after which it is no longer valid. Other information not specifically identified herein might also be included in the temporary security credentials 104.

From operation 304, the routine 300 proceeds to operation 306, where the temporary security credentials 104 generated at operation 304 are provided to the recipients identified at operation 302. The routine 300 then proceeds to operation 308, where a determination is made as to whether temporary security credentials 104 have been provided to all of the recipients identified at operation 302. If not, the routine 300 proceeds back to operation 306, where the credential service 102 continues the provision of temporary security credentials 104 to the intended recipients.

Once the credential service 102 has completed the distribution of temporary security credentials 104 at operation 308, the routine 300 proceed to operation 310. At operation 310, the credential service 102 may modify the current epoch version 126 so that the temporary security credentials 104 issued at operation 306 are valid and that any previously issued temporary security credentials 104 become invalid. For example, if the temporary security credentials 104 distributed at operation 306 indicate that epoch α=3, then the credential service 102 would instruct the epoch service 124 to set the current epoch version 126 for epoch α to 3 at operation 310. In this way, temporary security credentials 104 specifying epoch α=3 become valid for use and previously issued temporary security credentials 104 referencing a different current epoch version 126 for epoch α become invalid. From operation 310, the routine 300 may proceed back to operation 302, where the process described above may be periodically repeated.

Figure 4:
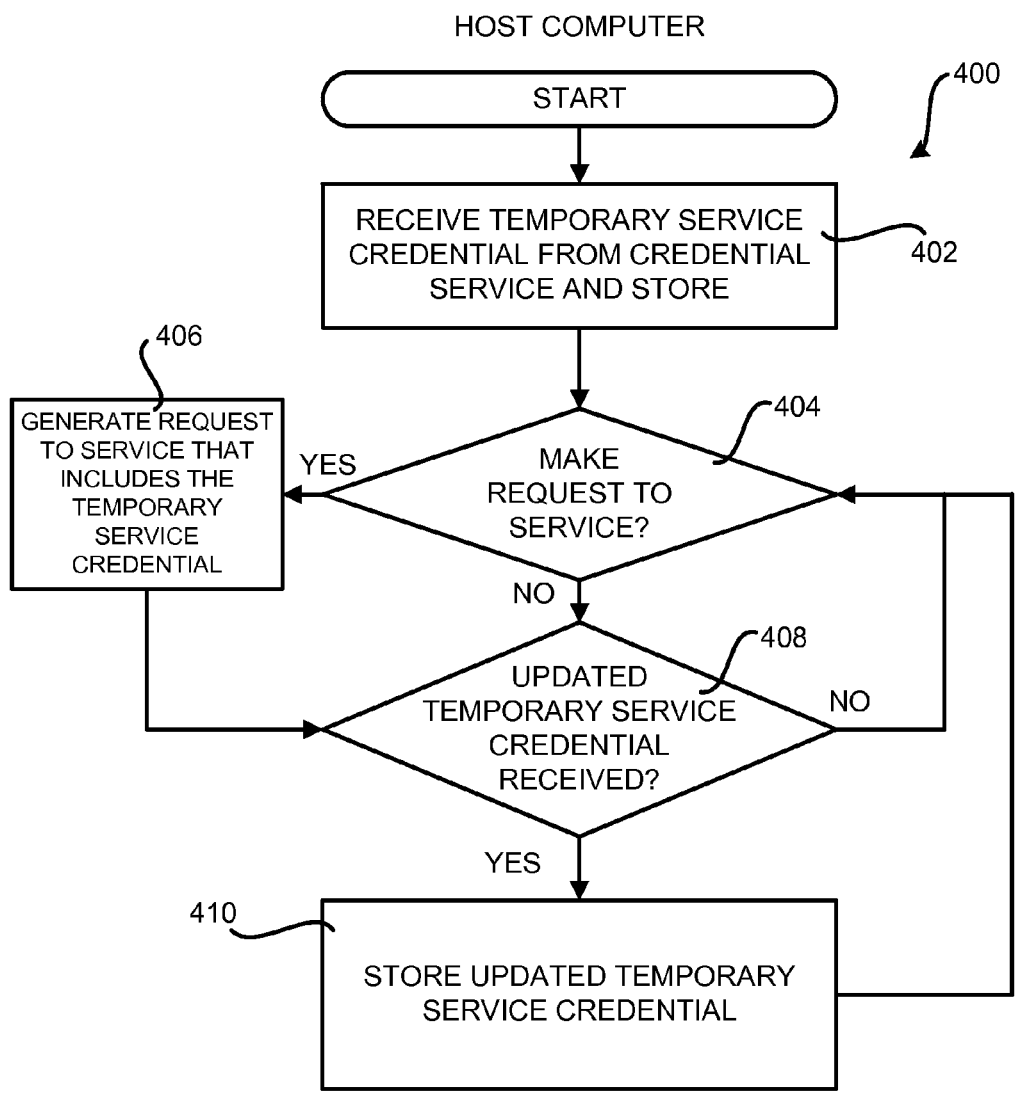
FIG. 4 is a flow diagram showing a routine that illustrates aspects of the operation of a host computer that receives and utilizes temporary security credentials in one system disclosed herein for epoch-based expiration of temporary security credentials.

FIG. 4 is a flow diagram showing a routine 400 that illustrates aspects of the operation of a host computer 106 for receiving and utilizing temporary security credentials 104 in one embodiment disclosed herein. As mentioned above, an application, such as an application executing in a virtual machine instance 108 on a host computer 106 in the distributed computing environment 102 may be issued temporary security credentials 104 and utilize these credentials when submitting requests 104 to other services 110, components, systems or entities. FIG. 4 illustrates aspects of this process, according to one embodiment disclosed herein.

The routine 400 begins at operation 402, where a host computer 106 receives a temporary service credential 104 from the credential service 102. The host computer 106 then stores the received temporary service credential 104 in an appropriate location. The routine 400 then proceeds to operation 404, where an application executing on the host computer 106 determines whether a service request 112 is to be made, such as to the service 110.

If a request 112 is to be made, the routine 400 proceeds from operation 404 to operation 406, where a request 112 is generated to the called service 110 that includes the supplied temporary service credential 104. The request 112 may then be submitted to the service 110 and processed in the manner described below with regard to FIG. 5. If no service request 112 is to be generated, the routine 400 proceed from operation 404 to operation 408.

At operation 408, the host computer 106 determines whether a new temporary service credential 104 has been received. As discussed above, the credential service 102 might periodically generate new temporary service credentials 104 and provide the new temporary service credentials 104 to the host computers 106 and other components in the distributed computing environment 100. If no new temporary service credential 104 has been received, the routine 400 may proceed from operation 408 back to operation 404, where the process described above may be repeated.

If a new temporary service credential 104 is received, the routine 400 proceeds from operation 408 to operation 410. At operation 410, the host computer 106 stores the new temporary service credential 104 for use in generating requests 112. The host computer 106 might also delete expired temporary service credentials 104 at operation 410. From operation 410, the routine 400 proceeds back to operation 404, where the process described above may be repeated.

Figure 5:
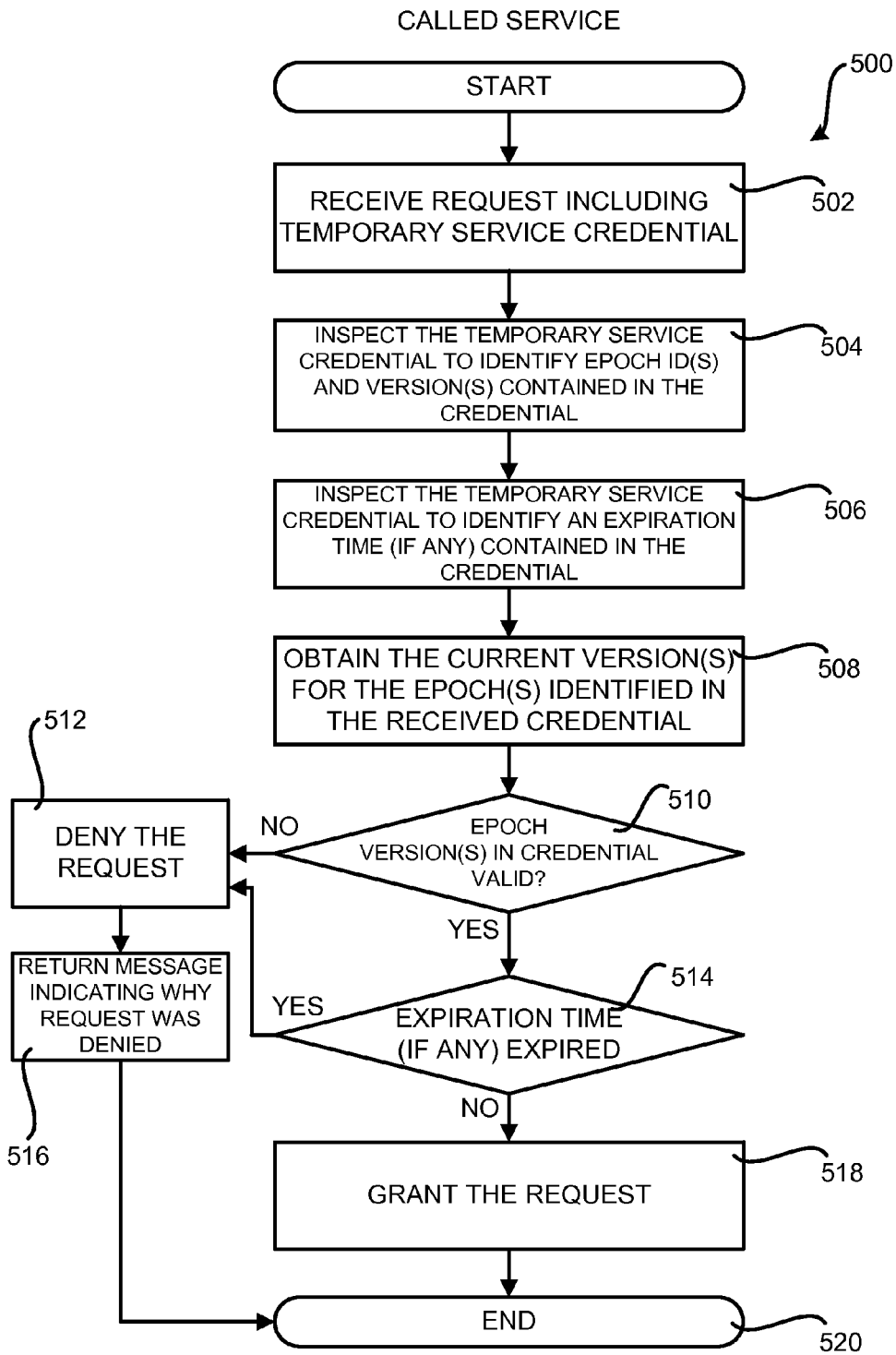
FIG. 5 is a flow diagram showing a routine that illustrates aspects of the operation of a called service that receives and utilizes temporary security credentials in one system disclosed herein for epoch-based expiration of temporary security credentials.

FIG. 5 is a flow diagram showing a routine 500 that illustrates aspects of the operation of a called service 110 for receiving and utilizing temporary security credentials 104 according to one embodiment disclosed herein. The routine 500 begins at operation 502, where a service 110 receives a request 112 that includes a temporary security credential 104. In response to receiving such a request 112, the routine 500 proceeds to operation 504, where the service 110 inspects the received temporary security credential 104 to identify the epoch identifier 118, or identifiers 118, and the corresponding epoch version 120, or versions 120, specified therein. At operation 506, the service 110 might also inspect the received temporary security credential 104 to determine if an expiration time 122 has also been specified therein.

From operation 506, the routine 500 proceeds to operation 508, where the service 110 obtains the current epoch version 126, or versions, for the epoch identifiers 118 specified in the received temporary security credential 104. As discussed above, for example, the service 110 might transmit a request 130 to the epoch service 124 for the current epoch version 126 of the identified epoch. Other mechanisms might also be utilized to obtain the current epoch version 126 for the epoch specified in the received temporary security credential 104.

From operation 508, the routine 500 proceeds to operation 510, where the service 110 determines whether the epoch version 120, or versions, specified in the received temporary security credential 104 are valid. This determination is made, at least in part, based upon a comparison of the epoch versions 120 specified in the received temporary security credential 104 and the current epoch version 126 for the identified epoch. If the epoch identified in the temporary security credential 104 is not valid, the routine 500 proceeds from operation 510 to operation 512. Alternately, in some embodiments some types of operations might be permitted even though an expired temporary security credential 104 has been supplied.

Whether or not the epoch version 120, or versions, specified in a received temporary security credential 104 is valid may be determined based upon various types of comparisons between the specified epoch version 120 and the current epoch version 126, or versions. For example, and without limitation, the epoch version 120 specified in a received temporary security credential 104 may be considered valid only if it matches exactly the current epoch version 126. Similarly, the epoch version 120, or versions, specified in a received temporary security credential 104 may be considered valid if they are greater than or equal to the current epoch version 126, or versions. In another example, the epoch version 120, or versions, specified in a received temporary security credential 104 may be considered valid if they are within a specified set of current epoch versions 126. Other types of comparisons might also be performed between an epoch version 120, or versions, specified in a received temporary security credential 104 and the current epoch version 126, or versions. In this regard, it should be appreciated that epoch versions need not be defined as sequential increasing numbers as used in the examples presented herein, but rather, may be any type of unique indicator, or indicators, defined in any order.

At operation 512, the request 112 may be denied. Additionally, at operation 516, a message may be returned in reply to the request 112 indicating that the request 112 was denied due to an expired epoch (or expiration time). It should be appreciated that a message may not be returned in reply to the request 112 indicating that the request 112 was denied. Moreover, if a message is returned in reply to the request 112, the message may include various levels of information in various embodiments, and may not necessarily specify the reason (i.e. the epoch was expired) for which the request 112 was denied. From operation 516, the routine 500 proceeds to operation 520, where it ends. Alternately, the routine 500 may proceed back to operation 502, where the process described above may be repeated.

If, at operation 510, the service 110 determines that the epoch version 120, or versions, specified in the received temporary security credential 104 is valid, the routine 500 proceeds from operation 510 to operation 514. At operation 514, the service 110 determines whether the expiration time 122 specified in the temporary security credential 104, if any, has expired. If the expiration time 122 is present and has expired, the routine 500 may proceed from operation 514 to operations 512 and 516, described above.

If the epoch version 120 and the expiration time 122 specified in the temporary security credential 104 are valid, the routine 500 proceeds to operation 518, where the request 112 may be granted. The routine 500 then proceeds from operation 518 to operation 520, where it ends. Alternately, the routine 500 may proceed back to operation 502, where the process described above may be repeated.

Figure 6:
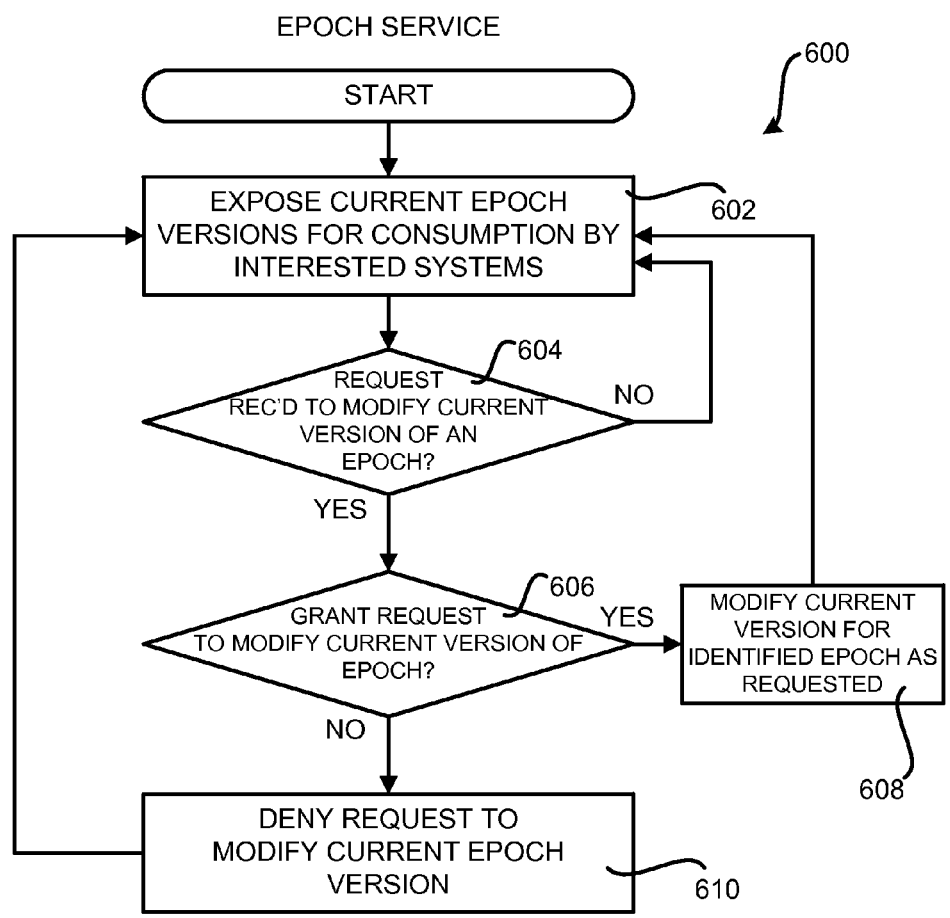
FIG. 6 is a flow diagram showing a routine that illustrates aspects of the operation of an epoch service in one system disclosed herein for epoch-based expiration of temporary security credentials.

FIG. 6 is a flow diagram showing a routine 600 that illustrates aspects of the operation of the epoch service 124, according to one embodiment disclosed herein. The routine 600 begins at operation 602, where the epoch service 124 exposes current epoch versions 126 for consumption by interested systems, services, components or other entities. For example, and as discussed above, the epoch service 124 might receive and respond to requests 130 from services 110 and other systems or components for the current epoch version 126 corresponding to an epoch identifier 118. Other mechanisms might also be utilized to expose the current epoch version 126 to interested entities.

From operation 602, the routine 600 proceeds to operation 604, where the epoch service 124 determines if a request 128 has been received to modify the current epoch version 126 for a particular epoch identifier 118. For example, the credential service 102 might submit a request 128 to modify the current epoch version 126 for a particular epoch identifier 118. If such a request has been received, the routine 600 proceeds from operation 604 to operation 606.

At operation 606, the epoch service 124 determines whether or not to grant the submitted request 128. For example, and without limitation, the epoch service 124 might determine whether the requestor has sufficient privileges to modify the current epoch version 126. Additionally, in some embodiments, the epoch service 124 might impose a restriction on how frequently a current epoch version 126 can be modified. In some embodiments, for example, the epoch service 124 may be configured to permit modification of a current epoch version 126 only after some predetermined period has elapsed since the previous modification of the current epoch version 126. As mentioned above, this may prevent inadvertent or premature modification of a current epoch version 126.

If, at operation 606, the epoch service 124 determines that the request 128 to modify the current epoch version 126 is to be granted, the routine 600 proceeds to operation 608, where the current epoch version 126 is modified in the requested manner. If, however, the epoch service 124 determines that the request 128 to modify the current epoch version 126 is to be denied, the routine 600 proceeds from operation 606 to operation 610, where the request 128 to modify the current epoch version 126 is denied. From operations 608 and 610, the routine 600 proceeds back to operation 602, where the process described above may be repeated.

It should be appreciated that various aspects of the functionality described above may be accessible through various types of network application programming interfaces ("APIs"). For example, and without limitation, APIs might be exposed for modifying the current epoch version 126, for obtaining the current epoch version 126, and for obtaining temporary security credentials 104. APIs might also be exposed for accessing other types of functionality disclosed herein. These APIs might be called by a customer in a service provider environment (described below) via a Web service or another appropriate mechanism. Additional details regarding an illustrative service provider environment will be provided below.

Figure 7:
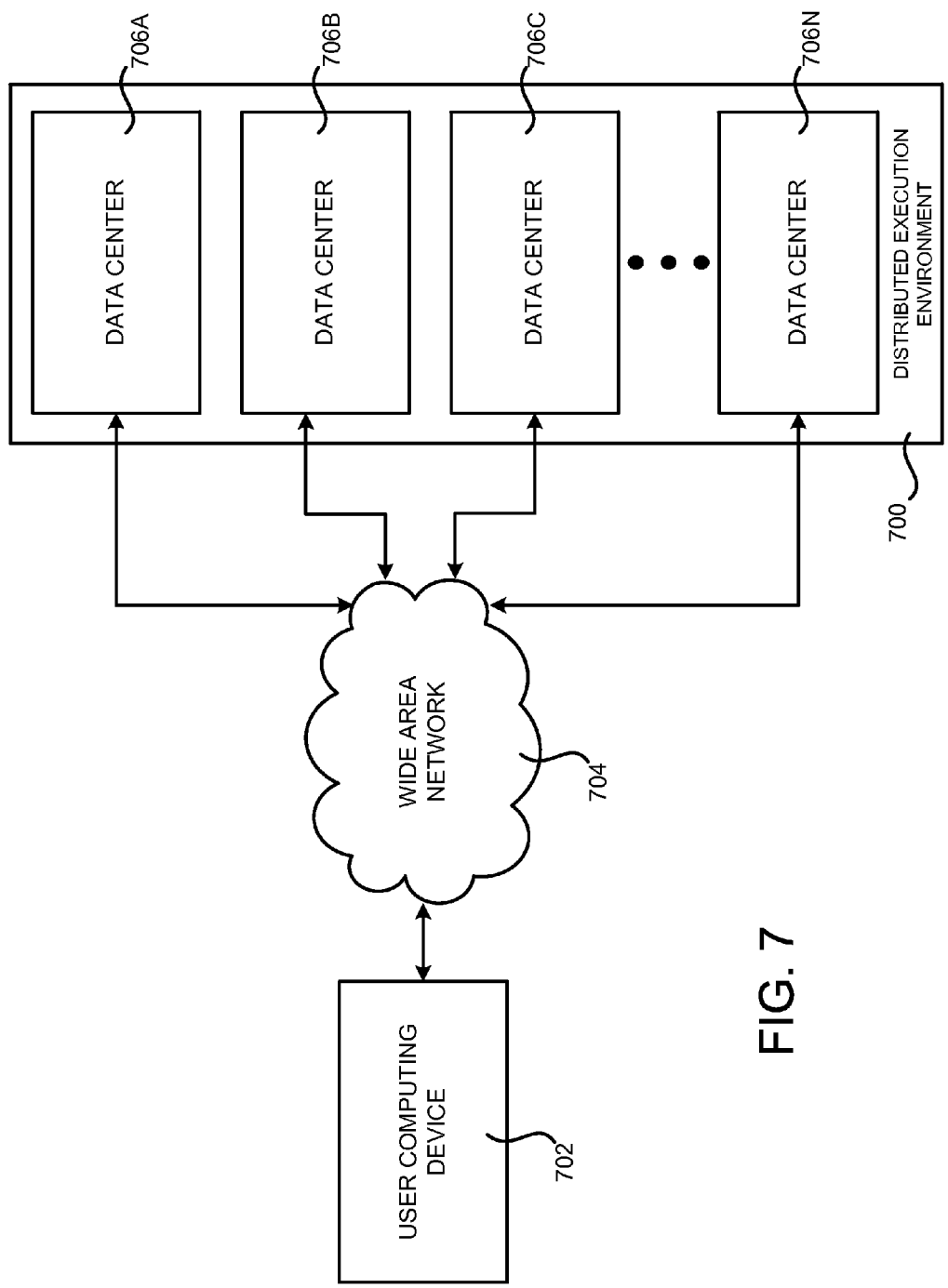
FIG. 7 is a system and network diagram that shows one illustrative operating environment for the embodiments disclosed herein that includes a distributed execution environment.

FIG. 7 and the following description are intended to provide a brief, general description of a suitable computing environment in which the embodiments described herein may be implemented. In particular, FIG. 7 is a system and network diagram that shows an illustrative operating environment that includes a distributed execution environment 700. The distributed execution environment 700 can provide computing resources on a permanent or an as-needed basis. The distributed execution environment 700 may be operated by a service provider and utilized to provide computing resources to customers (which might also be referred to as "tenants") of the service provider. Accordingly, the distributed execution environment 700 illustrated in FIG. 7 might also be referred to herein as a "service provider environment."

The computing resources provided by the distributed execution environment 700 may include various types of resources, such as data processing resources, data storage resources, networking resources, data communication resources, and the like. Each type of computing resource may be general-purpose or may be available in a number of specific configurations. For example data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. Each type or configuration of a computing resource may be available from the service provider operating the distributed execution environment 700 in different sizes, such as large resources, consisting of many processors, large amounts of memory, and/or large storage capacity, and small resources consisting of fewer processors, smaller amounts of memory, and/or smaller storage capacity. These computing resources might also be provided concurrently to multiple tenants.

As also mentioned above, the computing resources provided by the distributed execution environment 700 are enabled in one implementation by one or more data centers 706A-706N (which may be referred to herein singularly as "a data center 706" or collectively as "the data centers 706"). The data centers 706 are facilities utilized to house and operate computer systems and associated components. The data centers 706 typically include redundant and backup power, communications, cooling, and security systems. The data centers 706 might also be located in geographically disparate locations. One illustrative configuration for a data center 706 that may be utilized to implement the concepts and technologies disclosed herein will be described below with regard to FIG. 8.

Users of the distributed execution environment 700, such as customers of the service provider operating the environment 700, may access the computing resources provided by the data centers 706 over a suitable data communications network, such as a Wide Area Network ("WAN") 704. Although a WAN 704 is illustrated in FIG. 7, it should be appreciated that a local-area network ("LAN"), the Internet, or any other networking topology known in the art that connects the data centers 706 to user computing devices 702 may be utilized. It should also be appreciated that combinations of such networks might also be utilized.

Figure 8:
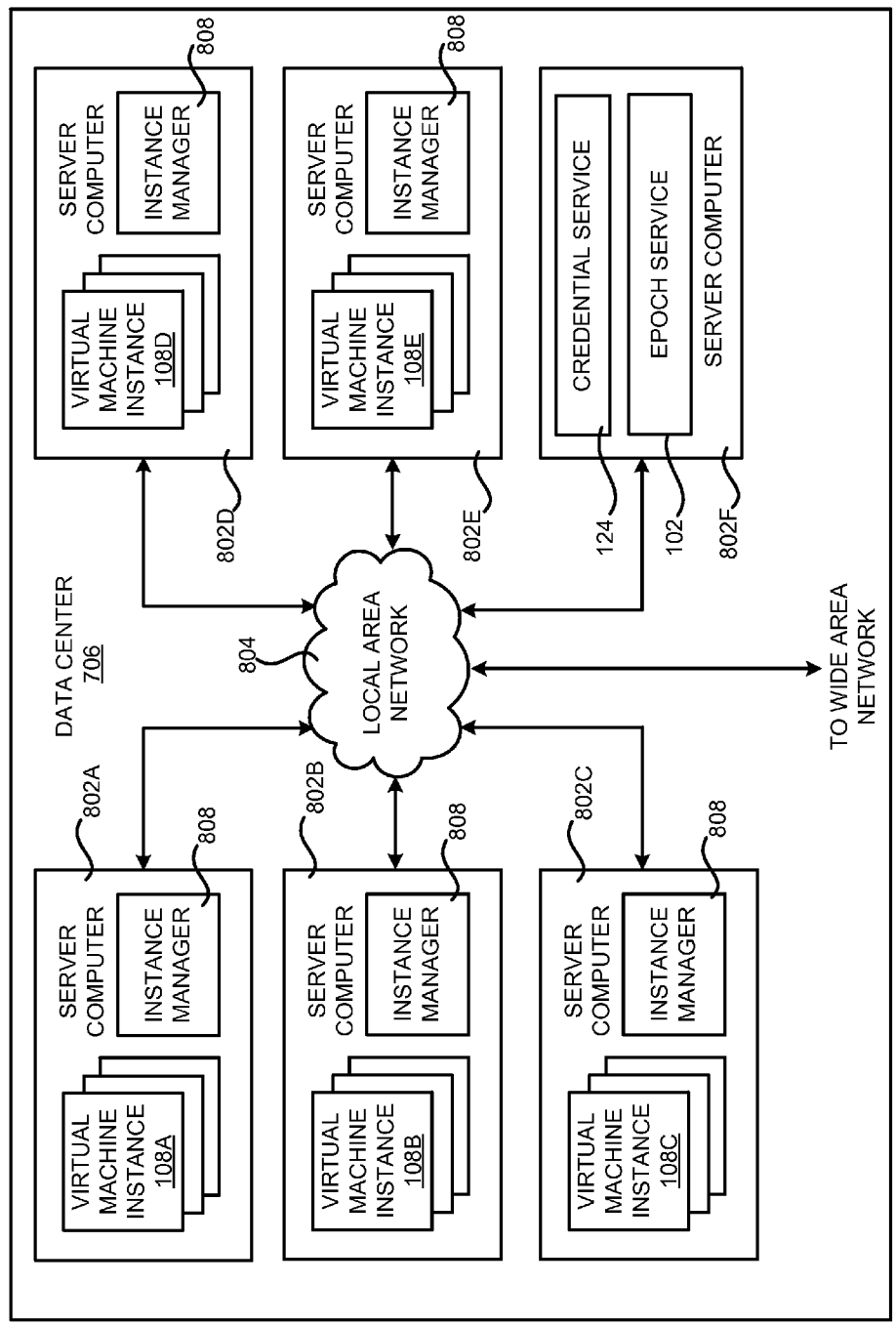
FIG. 8 is a computing system diagram that illustrates one configuration for a data center that may be utilized to implement aspects of the concepts and technologies disclosed herein.

FIG. 8 is a computing system diagram that illustrates one configuration for a data center 706 that implements a distributed execution environment 700, including the concepts and technologies disclosed herein. The example data center 706 shown in FIG. 8 includes several server computers 802A-802F (which may be referred to herein singularly as "a server computer 802" or in the plural as "the server computers 802"). As mentioned briefly above, the server computers 802 may be standard tower or rack-mount server computers configured appropriately for providing the computing resources described herein. For example, in one implementation the server computers 802 are configured to provide the virtual machine instances 108A-108E.

As known in the art, a virtual machine instance is an instance of a software implementation of a machine (i.e. a computer) that executes programs like a physical machine. Each of the servers 802 may be configured to execute an instance manager 808 capable of instantiating and managing the virtual machine instances 108. The instance manager 808 might be a hypervisor or another type of program configured to enable the execution of multiple virtual machine instances 108 on a single server 802, for example.

The server computers 802 in the data center 706 might also be utilized to execute the various software components described above. For instance, and as illustrated in FIG. 8, a server computer 802F may be configured to execute the credential service 124 and/or the epoch service 102. Details regarding the operation of each of these components have been provided above. In this regard, it should be appreciated that while these components are illustrated as executing within the distributed execution environment 700, computing systems that are external to the distributed execution environment 700 might also be utilized to execute some or all of these components. Other configurations might also be utilized.

In the example data center 706 shown in FIG. 8, an appropriate local area network ("LAN") 804 is utilized to interconnect the server computers 802A-802F. The LAN 804 is also connected to the WAN 704 illustrated in FIG. 7. It should be appreciated that the configuration and network topology illustrated in FIGS. 7 and 8 has been greatly simplified and that many more computing systems, networks, and networking devices may be utilized to interconnect the various computing systems disclosed herein. Appropriate load balancing devices or software modules might also be utilized for balancing a load between each of the data centers 706A-706N, between each of the server computers 802A-802F in each data center 704, and between virtual machine instances 108 provided by the server computers 802A-802F.

It should be appreciated that the data center 704 described in FIG. 8 is merely illustrative and that other implementations might be utilized. Additionally, it should be appreciated that the functionality provided by the software components described herein might be implemented in software, hardware, or a combination of software and hardware. Other implementations should be apparent to those skilled in the art.

As discussed briefly above, server computers 802 in the distributed execution environment 700 may provide the virtual machine instances 108. The virtual machine instances 108 may, for example, be purchased and utilized by customers of the service provider that operates the distributed execution environment 700. The service provider that operates the distributed execution environment 700 might also provide the credential service 102, the epoch service 124, and/or the service 110 in order to provide the functionality disclosed herein to its customers. For example, and without limitation, a virtual machine instance 108 purchased and operated by a customer of the service provider might be issued a temporary security credential 104 in the manner described herein in order to securely access one or more services 110 provided by the service provider. In this regard, it should be appreciated that this particular implementation is not to be seen as limiting, and that the embodiments disclosed herein might also be utilized in other types of computing environments.

Figure 9:
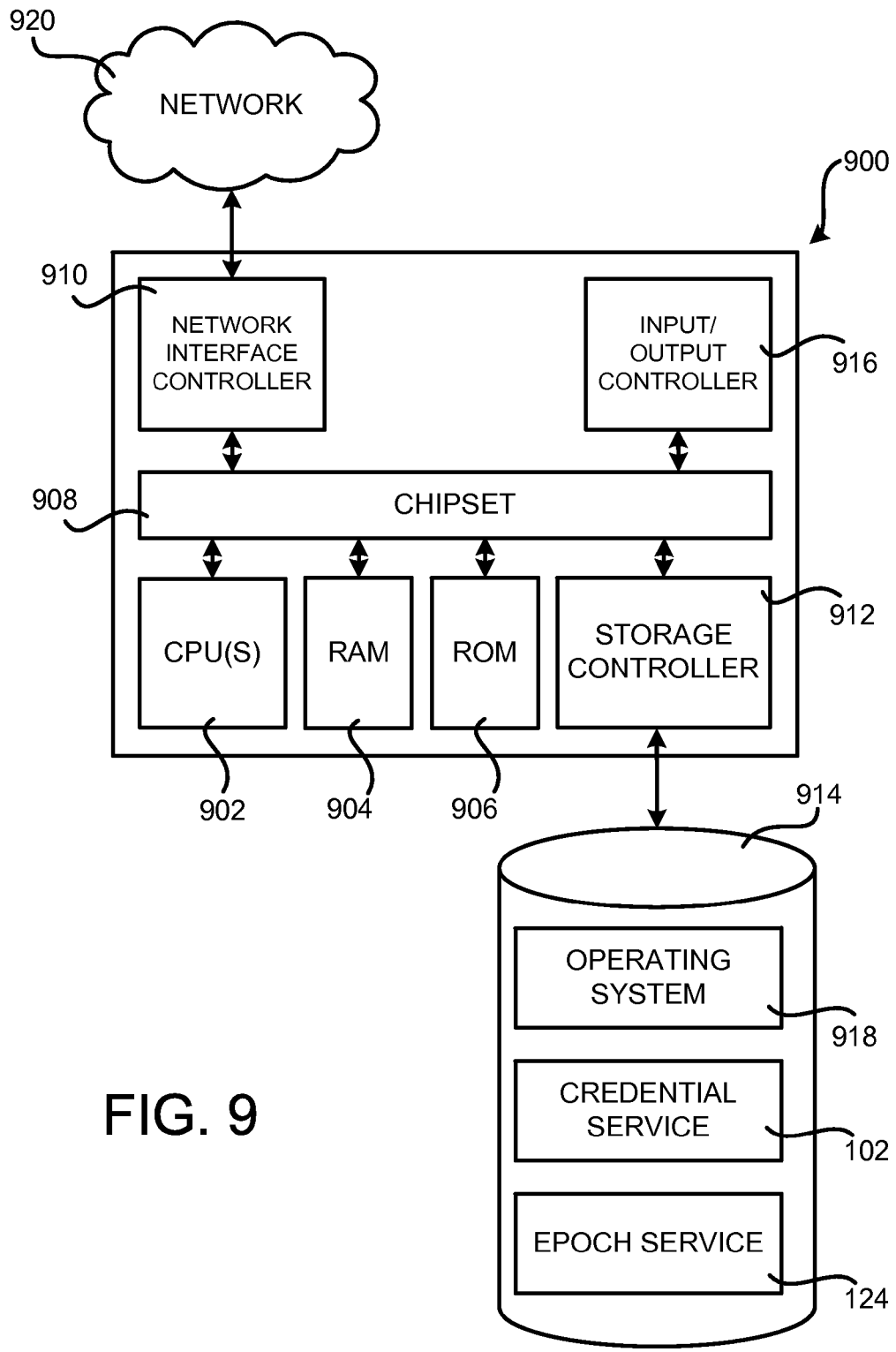
FIG. 9 is a computer architecture diagram showing an illustrative computer hardware architecture for computing devices described in embodiments presented herein.

FIG. 9 shows an example computer architecture for a computer 900 capable of executing the software components described herein. The computer architecture shown in FIG. 9 illustrates a conventional server computer, workstation, desktop computer, laptop, network appliance, PDA, electronic book reader, digital cellular phone, or other computing device, and may be utilized to execute any aspects of the software components presented herein. For example, and without limitation, the computer architecture shown in FIG. 9 might be utilized to implement server computers 802 that execute software components for implementing the functionality provided by the credential service 102, the host computers 108, a called service 110, and/or the epoch service 124. The computer architecture shown in FIG. 9 might also be utilized to implement other systems and/or components not specifically identified herein.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 908. The CPUs 902 are standard programmable processors that perform arithmetic and logical operations necessary for the operation of the computer 900.

The CPUs 902 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 908 provides an interface between the CPUs 902 and other components and devices on the baseboard. For instance, the chipset 908 may provide an interface to a random access memory ("RAM") 904, used as the main memory in the computer 900. The chipset 908 may further provide an interface to a computer-readable storage medium such as a read-only memory ("ROM") 906 or non-volatile RAM ("NVRAM") for storing basic routines that help to startup the computer 900 and to transfer information between the various components and devices. The ROM 906 or NVRAM might also store other software components necessary for the operation of the computer 900 in accordance with the embodiments described herein.

According to various embodiments, the computer 900 may operate in a networked environment using logical connections to remote computing devices and computer systems through the network 920, such as a LAN, a WAN, the Internet, or any other networking topology known in the art that connects the computer 900 to remote computers. The chipset 908 includes functionality for providing network connectivity through a network interface controller ("NIC") 910, such as a gigabit Ethernet adapter. The NIC 910 is capable of connecting the computer 900 to other computing devices over the network 920. It should be appreciated that any number of NICs 910 may be present in the computer 900, connecting the computer 900 to various types of networks and remote computer systems.

The computer 900 may be connected to a mass storage device 914 that provides non-volatile storage for the computer 900. The mass storage device 914 may store system programs, application programs, other program modules, and data, which are described in greater detail herein. The mass storage device 914 may be connected to the computer 900 through a storage controller 912 connected to the chipset 908. The mass storage device 914 may consist of one or more physical storage units. The storage controller 912 may interface with the physical storage units through a serial attached SCSI ("SAS") interface, a serial advanced technology attachment ("SATA") interface, a fiber channel ("FC")

interface, or other standard interface for physically connecting and transferring data between computers and physical storage devices.

The computer 900 may store data on the mass storage device 914 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 914 is characterized as primary or secondary storage, and the like.

For example, the computer 900 may store information to the mass storage device 914 by issuing instructions through the storage controller 912 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 914 by detecting the physical states or characteristics of one or more particular locations within the physical storage units.

In addition to the mass storage device 914 described above, the computer 900 may have access to other computer-readable storage media to store and retrieve information, such as program modules, data structures, or other data. It should be appreciated by those skilled in the art that computer-readable storage media can be any available non-transitory media that may be accessed by the computer 900. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 914 may store an operating system 918 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 914 may store other system or application programs and data utilized by the computer 900, such as program code for implementing the credential service 102, the epoch service 124, and/or any of the other components described above in regard to FIGS. 1-8.

In one embodiment, the mass storage device 914 or other computer-readable storage media may be encoded with computer-executable instructions that, when loaded into the computer 900, may transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 may have access to computer-readable storage media storing computer-executable instructions which, when executed by the computer 900, perform the routines 300, 400, 500 and 600 described above with regard to FIGS. 3-6, respectively.

The computer 900 might also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that various concepts and technologies for epoch-based expiration of temporary security credentials have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a credential system, cause the credential system to:
   generate a temporary security credential, the temporary security credential specifying an epoch identifier and a version of the epoch identifier, the temporary security credentials valid while the version of the epoch identifier matches a current version for the epoch identifier;
   send the temporary security credential to an electronic device; and
   after sending the temporary security credential to the electronic device, send, to an epoch system, a request to change a previous version for the epoch identifier that is stored by the epoch system to the current version for the epoch identifier.

2. The non-transitory computer-readable storage medium of claim 1, wherein the temporary security credential is validated based, at least in part, on the current version of the epoch identifier specified in the temporary security credential and the current version for the epoch as stored by the epoch system.

3. The non-transitory computer-readable storage medium of claim 1, wherein the current version for the epoch is made available by way of one or more of a network service, a database, or a broadcast.

4. The non-transitory computer-readable storage medium of claim 1, wherein the epoch identifier is associated with a geographic region, an availability zone, a role, an identity corresponding to the temporary security credential, the credential system, a virtual machine instance, or a customer account.

5. The non-transitory computer-readable storage medium of claim 1, wherein the temporary security credential further specifies an expiration time after which the temporary security credential is invalid.

6. A system for managing a lifetime of a temporary security credential, the system comprising:
  at least one computer system executing a credential service configured to generate a temporary security credential, the temporary security credential identifying an epoch and a version of the epoch; and
  at least one computer system executing a called service configured to:
    receive, from a host computer system, information based, at least in part, on a service request that includes the temporary security credential;
    send, to at least one computer system executing an epoch service, a request for a current version for the epoch;
    receive, from the at least one computer system executing the epoch service, an indication of the current version for the epoch; and
    determine to grant the service request based, at least in part, on the version of the epoch identified in the temporary security credential and the current version for the epoch.

7. The system of claim 6, further comprising the at least one computer system executing the epoch service configured to send the indication of the current version for the epoch to the at least one computer system executing the called service.

8. The system of claim 6, wherein the at least one computer system executing the credential service is further configured to generate a new temporary security credential, the new temporary security credential identifying the epoch and a new version of the epoch during which the new temporary security credential is valid.

9. The system of claim 6, wherein the host computer system is configured to obtain the temporary security credential and to generate the service request using the temporary security credential, and wherein the at least one computer system executing the credential service is further configured to:
  provide a new temporary security credential to the host computer; and
  modify the current version for the epoch to include a new version once the new temporary security credential has been distributed to the host computer.

10. The system of claim 9, wherein the host computer is operating in a service provider environment.

11. The system of claim 6, wherein the epoch is associated with a geographic region, an identity corresponding to the temporary security credential, availability zone, a role, the credential service, the host computer system, or a customer account.

12. The system of claim 6, wherein the at least one computer system executing the credential service is further configured send a request to the at least one computer system executing the epoch service, and wherein the at least one computer system executing the epoch service is further configured to modify the current version for the epoch to include the new version of the epoch in response to receiving the request from the at least one computer system executing the credential service.

13. The system of claim 12, wherein the at least one computer system executing the epoch service is further configured to expose an application programming interface for modifying an epoch version.

14. A computer-implemented method for managing a lifetime of a temporary security credential, the method comprising:
  receiving, at a computing system, and from a host computing system, a first request that includes the temporary security credential, the temporary security credential associated with at least an epoch identifier and at least an epoch version of the epoch identifier;
  sending, by the computing system, and to an epoch system, a second request for a current version for the epoch identifier;
  receiving, at the computing system, and from the epoch system, a message indicating the current version for the epoch identifier;
  determining, at the computing system, that the epoch version of the epoch identifier corresponds to the current version for the epoch identifier; and
  determining, at the computing system, to grant the first request based, at least in part, on the epoch version of the epoch identifier corresponding to the current version for the epoch identifier.

15. The computer-implemented method of claim 14, wherein the temporary security credential further defines an expiration time after which the temporary security credential is invalid, and wherein the method further comprises determining to grant the first request based, at least in part, on the expiration time specified in the temporary security credential.

16. The computer-implemented method of claim 14, wherein the epoch version of the epoch identifier associated with the temporary security credential is modified in order to invalidate the temporary security credential.

17. The computer-implemented method of claim 14, wherein the epoch identifier associated with the temporary security credential is associated with a geographic region, an availability zone, a role, a service configured to generate the temporary security credential, a virtual machine instance, or a customer account.

18. The computer-implemented method of claim 14, further comprising operating the computing system within a service provider environment.

19. The non-transitory computer-readable storage medium of claim 1, further storing instructions which, when executed by the credential system, cause the credential system to:
  generate a new temporary security credential, the new temporary security credential specifying the epoch identifier and a new version of the epoch identifier;
  send the new temporary security credential to the electronic device; and
  after sending the new temporary security credential to the electronic device, send, to the epoch system, an additional request to change the current epoch identifier that is stored by the ebock system to the new version of the epoch identifier.

20. The system of claim 6, further comprising the at least one computer system executing the epoch service configured to:
- store a previous version for the epoch identifier;
- receive, from the at least one computer system executing the credential service, a request to modify the previous version for the epoch identifier to the current version for the epoch identifier; and
- modify the previous version for the epoch identifier to the current version for the epoch identifier.

* * * * *